(12) United States Patent
Nakajima

(10) Patent No.: US 7,787,752 B2
(45) Date of Patent: Aug. 31, 2010

(54) INFORMATION PROCESSING APPARATUS AND METHOD, AND RECORDING MEDIUM

(75) Inventor: Yasuhisa Nakajima, Kanagawa (JP)

(73) Assignee: Sony Corporation (JP)

( * ) Notice: Subject to any disclaimer, the term of this patent is extended or adjusted under 35 U.S.C. 154(b) by 836 days.

(21) Appl. No.: 09/931,779

(22) Filed: Aug. 17, 2001

(65) Prior Publication Data
US 2002/0057900 A1 May 16, 2002

(30) Foreign Application Priority Data
Aug. 25, 2000 (JP) .............................. P2000-255425

(51) Int. Cl.
*H04N 5/91* (2006.01)
(52) U.S. Cl. .............................. 386/94; 386/95; 386/96; 386/52
(58) Field of Classification Search ............. 386/94–96, 386/124–126, 83; 360/60; 380/201–204; 705/51–59; 725/31; 713/201; 717/173; 369/59.21; 375/147
See application file for complete search history.

(56) References Cited

U.S. PATENT DOCUMENTS

| | | | |
|---|---|---|---|
| 4,520,404 A | | 5/1985 | Von Kohorn |
| 4,685,003 A * | | 8/1987 | Westland ...................... 386/52 |
| 4,704,725 A * | | 11/1987 | Harvey et al. ............... 380/242 |
| 4,930,158 A * | | 5/1990 | Vogel .......................... 386/94 |
| 4,945,563 A * | | 7/1990 | Horton et al. ............... 380/203 |
| 5,054,064 A * | | 10/1991 | Walker et al. ............... 380/239 |
| 5,343,251 A * | | 8/1994 | Nafeh ......................... 348/571 |
| 5,400,402 A * | | 3/1995 | Garfinkle ..................... 380/231 |
| 5,796,828 A * | | 8/1998 | Tsukamoto et al. .......... 380/203 |
| 5,930,446 A * | | 7/1999 | Kanda .......................... 386/52 |
| 6,061,319 A * | | 5/2000 | Fujiki ....................... 369/59.21 |
| 6,275,457 B1 * | | 8/2001 | Maeda ....................... 369/47.21 |
| 6,289,314 B1 * | | 9/2001 | Matsuzaki et al. ........... 705/1.1 |
| 6,381,262 B1 * | | 4/2002 | Ogino ........................ 375/147 |
| 6,389,538 B1 * | | 5/2002 | Gruse et al. ................. 713/194 |
| 6,470,496 B1 * | | 10/2002 | Kato et al. .................. 717/173 |
| 6,487,720 B1 * | | 11/2002 | Ohishi ......................... 725/31 |
| 6,496,896 B1 * | | 12/2002 | Inoue ......................... 710/306 |

(Continued)

FOREIGN PATENT DOCUMENTS

EP 0 831 648 A2 3/1998

(Continued)

*Primary Examiner*—Jamie J Atala
(74) *Attorney, Agent, or Firm*—Lerner, David, Littenberg, Krumholz & Mentlik, LLP

(57) ABSTRACT

The present invention is intended to control the reproduction, duplication, or charging of content recorded to a recording/reproducing apparatus using a storage-type medium. Storage control information includes data for controlling content recorded to a storage-type medium such as a hard disk drive. For example, if "0x01" is written to the first byte of this data and "0xMM" to the second byte, the content will be deleted when it has been reproduced MM times. If "0x22" is written to the first byte and "0xNN" to the third byte, the content will be deleted after the passing of NN days. If restrictions are set to both the reproduction count and the passing days, different pieces of storage control information are attached to the content; for example, content is deleted in accordance with the number of times the content is copied to another medium and charge discount setting is performed on the number of times the content is reproduced.

12 Claims, 12 Drawing Sheets

U.S. PATENT DOCUMENTS

| | | | |
|---|---|---|---|
| 6,622,004 B1 * | 9/2003 | Sonoda et al. | 455/3.05 |
| 6,732,366 B1 * | 5/2004 | Russo | 725/5 |
| 6,839,851 B1 * | 1/2005 | Saitoh et al. | 726/13 |
| 6,847,778 B1 * | 1/2005 | Vallone et al. | 386/68 |
| 2002/0006268 A1 * | 1/2002 | Chotoku et al. | 386/83 |

FOREIGN PATENT DOCUMENTS

| | | |
|---|---|---|
| EP | 0 975 165 A2 | 1/2000 |
| JP | 8-077706 A | 3/1996 |
| JP | 11-234645 A | 8/1999 |
| JP | 2000-004422 A | 1/2000 |
| JP | 2000-165788 A | 6/2000 |
| WO | WO-97/37492 | 10/1997 |
| WO | WO-00/39947 | 7/2000 |

* cited by examiner

| | |
|---|---|
| DELETE AFTER REPRODUCTION (MM) TIMES | 0x01, 0xMM, 0x00 |
| DELETE AFTER (NN) DAYS | 0x02, 0x00, 0xNN |
| DELETE AFTER (NN) DAYS OR AFTER REPRODUCTION (MM) TIMES, WHICHEVER IS EARLIER | 0x03, 0xMM, 0xNN |
| DELETE AFTER COPYING (MM) TIMES | 0x04, 0xMM, 0x00 |
| LOW CHARGE CONTENT | 0x1--, 0x--, 0x-- |

FIG.7

| FAT | SERVICE -ID | ECM FIXED PART ATTRIBUTE DATA | ECM VARIABLE PART ATTRIBUTE DATA | EMM ATTRIBUTE DATA |
|---|---|---|---|---|
| xxx | ooo | xxxxx | 0x03, 0x02, 0x02 | △△△ |
| xxx | ooo | xxxxx | 0x01, 0x01, 0x00 | △△△ |
| xxx | ooo | xxxxx | 0x04, 0xMM, 0x00 | △△△ |

```
If(transmission_format=="00"){
    Additional_arib_carousel_info()
    Ondemand_retrieval_flag
    File_storable_flag
    Reserved_future_use
```

INFORMATION PROCESSING APPARATUS AND METHOD, AND RECORDING MEDIUM

CROSS-REFERENCE TO RELATED APPLICATIONS

The present application claims priority from Japanese Application No. P2000-255425 filed Aug. 25, 2000, the disclosure of which is hereby incorporated by reference herein.

BACKGROUND OF THE INVENTION

The present invention relates generally to an information processing apparatus and method and a recording medium and, more particularly, to an information processing apparatus and method and a recording medium in which the broadcast data supply side attaches control information to each piece of content of the broadcast data to be stored in a storage-type medium of a receiver which records the broadcast data, thereby setting limits to the length of time the content can be stored or the number of times the stored content can be reproduced or copied.

Recently, digital television broadcasts including BS (Broadcasting Satellite) have been gaining in popularity, broadcasting many programs (content) as compared with ground-based broadcasts. Based on this, it has become a general practice for recording/reproducing apparatuses to receive the digital broadcast data and record the received digital broadcast data to storage-type media represented by a hard disk, for example.

However, the regulations of BS digital television broadcasting do not allow the service providers to set conditions such as allowing the broadcast content stored in storage-type media to be reproduced within a predetermined time period or by a predetermined number of times, for example, even if the broadcast content has been purchased.

SUMMARY OF THE INVENTION

It is therefore an object of the present invention to provide an information processing apparatus and method and a recording medium which allow the broadcast data providing side to include control information in each content of the broadcast data to be stored in a storage-type medium of a receiver for receiving and storing the broadcast data, thereby setting restrictions on the storage period of time or the reproduction or copy count of the stored content.

In carrying out the invention and according to one aspect thereof, there is provided a first information processing apparatus including a first input controller operable to control the input of first data to be multiplexed with content to be broadcast by digital broadcasting; a first generating unit operable to generate first control information associated with the deletion of the content if the content is received by a receiver and recorded to a storage-type recording medium; and an inserting unit operable to insert the first control information into the first data.

The first control information may include a storable period of time for storing the content.

The first control information may include the number of times the content can be reproduced.

The first control information may include the number of times the content can be copied.

The above-mentioned first information processing apparatus may further include a second generating unit operable to generate second control information associated with the charging for the content on the basis of a number of times the content can be reproduced if the content has been received by the receiver and recorded to the storage-type recording medium, the inserting unit inserting the second control information into the first data.

The above-mentioned first information processing apparatus may further include a second input controller operable to control the input of video data and audio data to be multiplexed with the content to be broadcast by digital broadcasting; and a second generating unit operable to generate second data by multiplexing the first data inserted with the first control information with the video data and the audio data.

The second data may be an MPEG2 transport stream and the first control information may be inserted in an ECM section of the MPEG2 transport stream.

The second data may be transmitted in a carousel manner and the first control information may be inserted in an adaptation header of a DII packet.

The second data may be transmitted in a carousel manner and the first control information may be inserted in an expire descriptor of a DII packet.

In carrying out the invention and according to another aspect thereof, there is provided a first information processing method. The method includes controlling the input of data to be multiplexed with content to be broadcast by digital broadcasting; generating control information associated with the deletion of the content if the content is received by a receiver and recorded to a storage-type recording medium; and inserting the control information into the data.

In carrying out the invention and according to still another aspect thereof, there is provided a recording medium recorded with a computer-readable program for processing information. The program includes controlling the input of data to be multiplexed with content to be broadcast by digital broadcasting; generating control information associated with the deletion of the content if the content is received by a receiver and recorded to a storage-type recording medium; and inserting the control information into the data.

In carrying out the invention and according to yet another aspect thereof, there is provided a second information processing apparatus including a first acquiring unit operable to acquire a plurality of pieces of content broadcast by digital broadcasting; a first recording controller operable to control the recording of the plurality of pieces of content; a second acquiring unit operable to acquire first control information associated with the deletion of content included in the plurality of pieces of content; a second recording controller operable to control the recording of the first control information; a selector operable to select, on the basis of the first control information, the content to be deleted from among the plurality of pieces of content; and a deletion controller operable to control the deletion of the content selected by the selector.

The above-mentioned selector, if any of the plurality of pieces of content has been reproduced or copied to another recording medium, may select the content to be deleted from among the plurality of pieces of content.

The above-mentioned selector may select, at a predetermined time interval, the content to be deleted from among the plurality of pieces of content.

The above-mentioned first control information may include a storable period of time for the content.

The above-mentioned first control information may include a number of times the content can be reproduced.

The above-mentioned first control information may include a number of times the content can be copied.

The second information processing apparatus may further include a third acquiring unit operable to acquire second control information associated with the charging which is set on the basis of a number of times the content can be reproduced included in the content; a third recording controller operable to control the recording of the second control information; and a charging unit operable to charge, on the basis of the second control information, the reproduction of the content.

In carrying out the invention and according to a different aspect thereof, there is provided a second information processing method. The method includes acquiring a plurality of pieces of content broadcast by digital broadcasting; controlling the recording of the plurality of pieces of content; acquiring control information associated with the deletion of content included in the plurality of pieces of content; controlling the recording of the control information; selecting, on the basis of the control information, the content to be deleted from among the plurality of pieces of content; and controlling the deletion of the content selected in the selecting step.

In carrying out the invention and according to a still different aspect thereof, there is provided a second recording medium recorded with a computer-readable program for processing information. The program includes acquiring a plurality of pieces of content broadcast by digital broadcasting; controlling the recording of the plurality of pieces of content; acquiring first control information associated with the deletion of content included in the plurality of pieces of content; controlling the recording of the first control information; selecting, on the basis of the first control information, the content to be deleted from among the plurality of pieces of content; and controlling the deletion of the content selected in the selecting step.

As described and according to the first information processing apparatus and method and the program recorded in the recording medium associated with the invention, in the case where the input of data to be multiplexed with content to be broadcast by digital broadcasting is controlled, the content is received by a receiver, and the received content is recorded to a storage-type recording medium, the control information about the deletion of the content is generated and the generated control information is inserted in the data whose input is controlled. Consequently, this novel constitution can generate the control information for restricting the storage period of time of the content recorded to a storage-type recording medium and the number of times the content is reproduced or copied.

As described and according to the second information processing apparatus and method and the program recorded in the recording medium associated with the invention, content broadcast by digital broadcasting is captured, the recording of the plural pieces of captured content is controlled, the control information associated with content deletion included in the captured content is captured, the recording of the captured control information is controlled, and, on the basis of the control information, a piece of content to be deleted is selected from among the plural pieces of content, and the selected piece of content is deleted. Consequently, the novel constitution can capture the broadcast data containing the control information and, on the basis of this control information, prevent the content from being recorded.

BRIEF DESCRIPTION OF THE DRAWINGS

These and other objects of the invention will be seen by reference to the description, taken in connection with the accompanying drawing, in which:

FIG. 7 is a diagram for describing a content management database stored in a flash ROM shown in FIG. 6;

DETAILED DESCRIPTION

This invention will be described in further detail by way of example with reference to the accompanying drawings.

Figure 1:
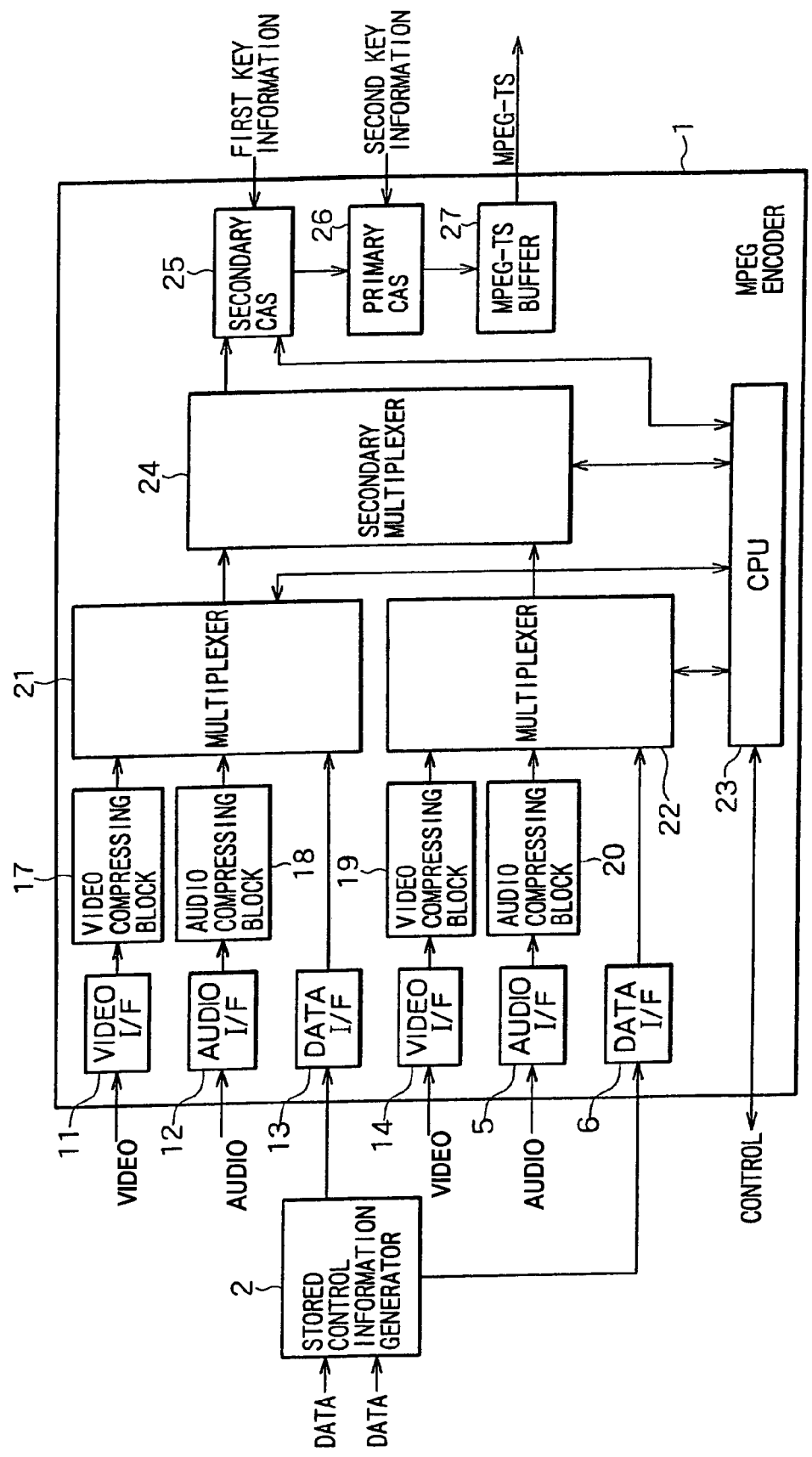
FIG. 1 is block diagram illustrating an exemplary configuration of an MPEG encoder.

Now, referring to FIG. 1, there is shown a block diagram illustrating an exemplary configuration of an MPEG (Motion Picture Experts Group) encoder 1 for generating a broadcast data stream in a broadcast station for broadcasting general television programs.

Video data and audio data, which are sources of a program stream and a data broadcast stream, are input in a video I/F (InterFace) 11, an audio I/F 12, a video I/F 14 or an audio I/F 15 of an MPEG encoder 1. Data added to the program stream and the data broadcast stream is input in a storage control information generator 2 to be described later in which the data is attached with storage control information to be described later with reference to FIG. 3, the resultant data being input in a data I/F 13 or a data I/F 16 of the MPEG encoder 1.

The data I/F 13 receives the data to be attached to the program stream from the storage control information generator 2 and outputs this data to a multiplexer 21. The I/F 16 receives the data to be attached to the data broadcast stream from the storage control information generator 2 and outputs this data to a multiplexer 22.

The video I/F 11 receives the video data, which is the source of the program stream, and outputs the video data to a video compressing block 17. The audio I/F 12 receives the audio data, which is the source of the program stream, and outputs the audio data to an audio compressing block 18. The video I/F 14 receives the video data, which is the source of the data broadcast stream, and outputs the video data to a video compressing block 19. The audio I/F 15 receives the audio data, which is the source of the data broadcast stream, and outputs the audio data to an audio compressing block 20.

The video compressing block 17 and the audio compressing block 19 encode and compress the input video data by MPEG. The audio compressing block 18 and the audio compressing block 20 encode and compress the input audio data. The multiplexer 21 and the multiplexer 22 receive the compressed video data, the compressed audio data, and the data input from the data I/F 13 or the data I/F 16 and multiplex these data, outputting the multiplexed data to a secondary multiplexer 24.

A CPU (Central Processing Unit) 23 controls the multiplexer 21 and the multiplexer 22 on the basis of the various commands input by the manager of the MPEG encoder 1 through an input section, not shown, and the control signals input from another personal computer, not shown, for example and, receiving the bit rate information of the encoded stream from the multiplexer 21 and the multiplexer 22, controls the secondary multiplexer. Also, on the basis of a control signal input from an input section, not shown, the CPU 23 generates a control signal for specifying the attachment of key information and charge information to each content, outputting the generated control signal to a secondary CAS (Conditional Access System) 25.

In accordance with the control signal input from the CPU 23, the secondary multiplexer 24 multiplexes the data multiplexed by the multiplexer 21 and the multiplexer 22 and outputs the resultant data to the secondary CAS 25 as MPEG-TS (Transport Stream) data.

In accordance with a control signal input from the CPU 23, the secondary CAS attaches each content (program) multiplexed in the secondary multiplexer 24 with the first key information for restricting the access right for each content and charge information and outputs the resultant content to a primary CAS 26. The access right for each content restricted by the key attached by the secondary CAS 25 is set in order to restrict pay content and content for adults for example. Some kinds of content are not attached with the key information in the secondary CAS.

The primary CAS attaches secondary key information to the entire input data stream and outputs the resultant data stream to an MPEG-TS buffer 27. The MPEG-TS buffer 27 buffers the input MPEG-TS and outputs it to a transmitter, not shown, in a predetermined timed relation. The MPEG-TS input in the transmitter, not shown, is modulated by a predetermined modulation scheme to be broadcast to each home via a communication satellite, not shown.

The present description is made by use of the MPEG encoder 1 as an example for multiplexing a program stream and a data broadcast stream. It will be apparent that a plurality of streams can be multiplexed by adding corresponding blocks to the MPEG encoder 1.

Figure 2:
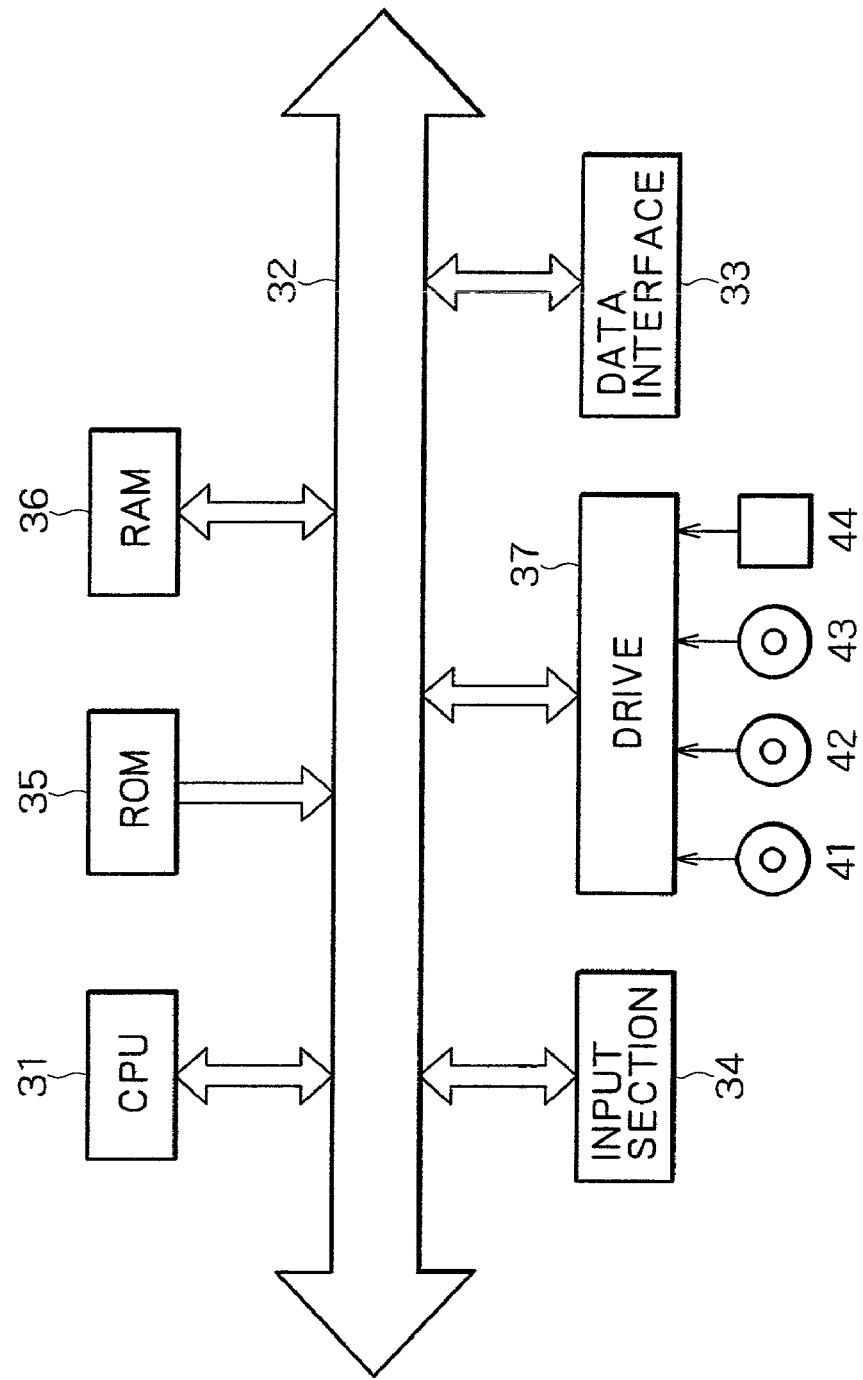
FIG. 2 is a block diagram illustrating an exemplary configuration of a storage control information generator.

Now, referring to FIG. 2, there is shown a block diagram illustrating an exemplary configuration of the storage control information generator 2.

A CPU 31 generates storage control information to be described later with reference to FIG. 3 on the basis of a signal input from an input section 34 via an internal bus 32 and attaches the generated storage control information to the data input via a data interface 33 and the internal bus 32, outputting the resultant data to an MPEG encoder 1 via the internal bus 32 and the data interface 33. The input section 34 may be a keyboard for example from which an operator can input various commands or an input/output interface which can receive the controls signals from a personal computer, not shown.

A ROM (Read Only Memory) 35 stores basically fixed data among the programs and computation parameters for use by the CPU 31. A RAM (Random Access Memory) 36 stores the programs for use in the execution of the CPU 31 and the parameters which change from time to time in this execution. The CPU 31, the ROM 35, the data interface 33, the input section 34, and the RAM 36 are interconnected by the internal bus 32.

The internal bus is also connected to a drive 37 which is loaded with a magnetic disc 41, an optical disc 42, a magneto-optical disc 43, or a semiconductor memory 44 as required for data transfer.

The CPU 31 receives the data to be added to a program stream and a data broadcast stream via the data interface 33 and the internal bus 32 and generates storage control information in accordance with a control signal input from the input section 34 via the internal bus 32. When the content in a broadcast stream generated by the MPEG encoder 1 is received by a receiver 51 to be described later with reference to FIG. 6 and is stored in a storage-type medium (for example, a hard disk drive HDD 68 shown in FIG. 6), the storage control information restricts the storage period of time of the content or the number of times the content is reproduced or copied or changes the charge in accordance with the number of times the content is reproduced. The storage control information is 3 bytes wide for example, a first byte being indicative of the contents of control, a second byte being indicative of the number of times the content is reproduced, and a third byte being indicative of the number of days, for example.

To the content which will be deleted after the reproduction by a predetermined count, the storage control information is added in which "0x01" indicative that this content will be deleted according to the reproduction count is written to the first byte and "0xMM" (MM being the count) indicative of the number of times the content can be reproduced is written to the second byte, for example.

To the content which will be deleted after the predetermined number of days have passed, the storage control information is added in which "0x01" indicative that this content will be deleted in accordance with the predetermined number of passed days is written to the first byte and "0xNN" (NN being the number of days) indicative of the number of days from the recording to the deletion of this content is written to the second byte, for example.

To the content which will be deleted when the reproduction count or the number of passed days has been reached, whichever is earlier, the storage control information is added in which "0x03" indicative that this content will be deleted when the reproduction count or the number of passed days has been reached, whichever is earlier, is written to the first byte, "0xMM" (MM being the count) indicative of the number of times this content can be reproduced is written to the second byte, and "0xNN" (NN being the number of days) indicative of the number of days is written to the third byte, for example.

When the data has been copied to another medium, the content will be deleted in accordance with the number of copy made, and the storage control information is added to the content, for example, "0x04" indicating that this content will be deleted in accordance with the copy count is described in the first byte, and "0xMM" (MM being the count) indicating a copyable count is described in the second byte. Obviously, setting MM to 1 allows the moving of data from a storage-type medium but disallows the copying thereof.

In addition to the information specifying the conditions associated with content deletion, the storage control information may include information for specifying charge-discounted content. The charge-discounted content denotes a particular piece of content of which charge is discounted as the number of times it is copied increases. In the storage control information to be attached to charge-discounted content, "0x1–" ("–" depends on the information for restricting content deletion) indicative that this content is charge-discounted content is written to the first byte.

Figures 3, 4:
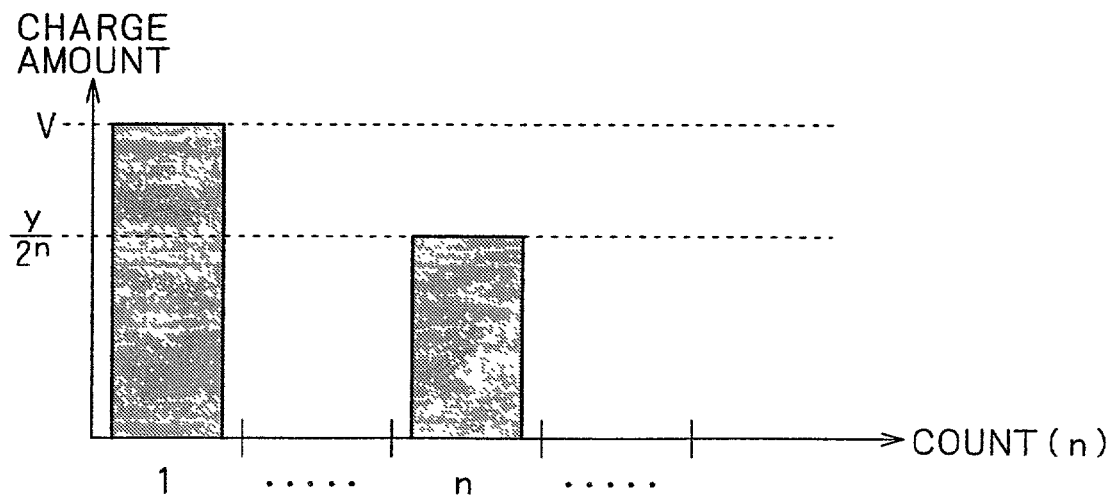
FIG. 3 is a diagram for describing storage control information.
FIG. 4 is a graph for describing charge discounted content.

As shown in FIG. 4, in charge-discounted content, a relationship between reproduction count n and the amount of charge for the n-th viewing is set to y/2n, where y is an amount of charge (a normal amount of charge) for the first viewing of content. Consequently, in the receiver 51 to be described with reference to FIG. 6, if a user of the receiver 51, namely the content viewer, records charge-discounted content to a storage-type medium (for example, the hard disk drive 68 shown in FIG. 6) and reproduces it multiple times for viewing, the amount of charge for each viewing is discounted from the normal amount of charge every time the content is viewed.

In addition, when providing restrictions for content deletion, the storage control information corresponding to these restrictions may be generated and added to the content concerned. Consequently, in the receiver 51 shown in FIG. 6, a decision may be made whether to delete content or not by referencing the storage control information attached to the content.

Then, the CPU 31 inserts the generated storage control information into the input data, outputs the data to be multiplexed with the program stream to the data I/F 13 of the MPEG encoder, and outputs the data to be multiplexed with the data broadcast stream to the data I/F 16 of the MPEG encoder 1.

The data including the storage control information input in the data I/F 13 is input in the multiplexer 21 to be multiplexed with the video data encoded and compressed by MPEG in the video compressing block 17 and the audio data encoded and compressed in the audio compressing block 18. Likewise, the data including the storage control information input in the data I/F 16 is input in the multiplexer 22 to be multiplexed with the video data encoded and compressed by MPEG in the video compressing block 19 and the audio data encoded and compressed in the audio compressing block 20. The multiplexed program stream and data broadcast stream are further multiplexed in the secondary multiplexer 24, the resultant stream is added with key information (namely, scrambled) in the secondary CAS 25 and the primary CAS 26, and the resultant stream is outputted to the transmitter, not shown, via the MPEG-TS buffer 27 to be broadcasted.

Figure 5:
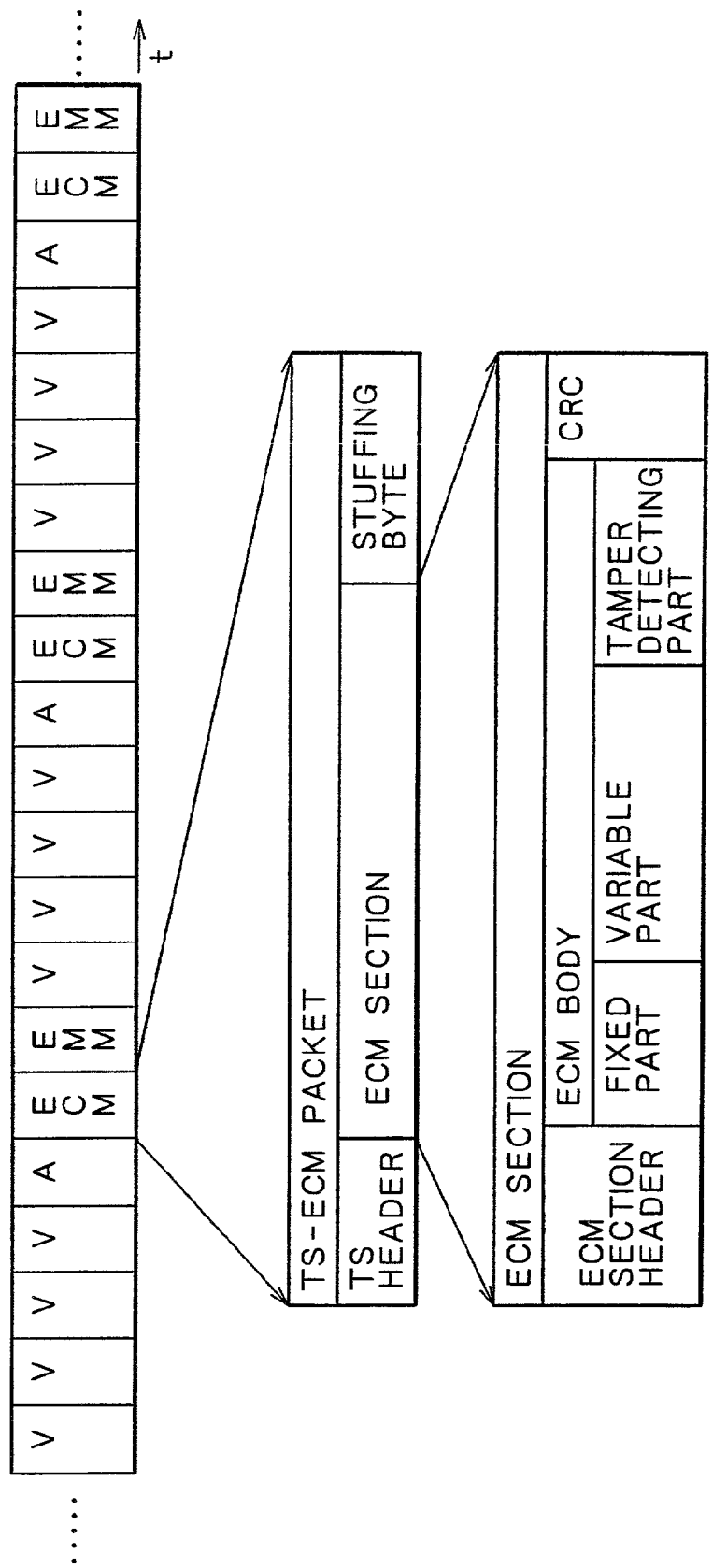
FIG. 5 is a diagram illustrating an exemplary structure of MPEG-TS generated by the MPEG encoder shown in FIG. 1.

FIG. 5 shows an exemplary structure of an MPEG2-TS to be generated by the MPEG encoder 1. In the MPEG2-TS, video data, audio data, ECM (Entitlement Control Message (key common information)), and EMM (Entitlement Management Message (key individual information)) are multiplexed.

ECM and EMM are not directly input in the MPEG encoder 1; they are input in the storage control information generator 2. ECM is information for decrypting encrypted information. EMM is information for setting, for each receiver, such parameters as customer management, changing of encryption keys, and permission of viewing.

A TS-ECM packet is information for defining the attribute of the MPEG2-TS having PID (Packet Identifier) to be specified in this packet. One TS-ECM packet is 188 bytes wide and constituted by a 5-byte header, a variable-length ECM section, and stuffing bytes, which are dummy bytes for making uniform the lengths of packets.

The ECM section is constituted by an 8-byte ECM section header, an ECM body, and a 4-byte CRC (Cyclic Redundancy Check), which is sign data for error detection. The ECM body is constituted by a fixed part of 26-byte fixed data, a variable part in which various functional information can be arranged, and a 4-byte tamper detecting part, which is a code for checking the ECM body for any tamper.

The ECM fixed part contains data consisting of attribute data defined by ARIB (Association of Radio Industries and Business) STD-B25. The fixed part contains protocol number, pay business identification information, work key identification information, odd and even scramble keys, decision type information, date and time information, and recording control information.

The protocol number is 1-byte data for processing common information. The pay business identification information is a 1-byte code for identifying a business body in pay broadcast operation and specifies individual information to be referenced along with the work key identification information. The work key identification information is 1-byte data for specifying a work key for decrypting common information. The odd and even scramble keys are each 8-byte data. The decision type information 1-byte data indicative whether the information concerned is free of charge or PPV (Pay Per View) for example. The date and time information is 5-byte data indicative of the date and time for use in the decision of viewing. The recording control information is 1-byte data indicative of recording conditions (for example, recording enabled or disabled or recording enabled only for purchaser) for the program concerned.

In the ECM variable part, various functional data (attribute data), which are not arranged in the fixed part, can be arranged. The storage control information generated in the storage control information generator 2 is attached to the variable part.

Figure 6:
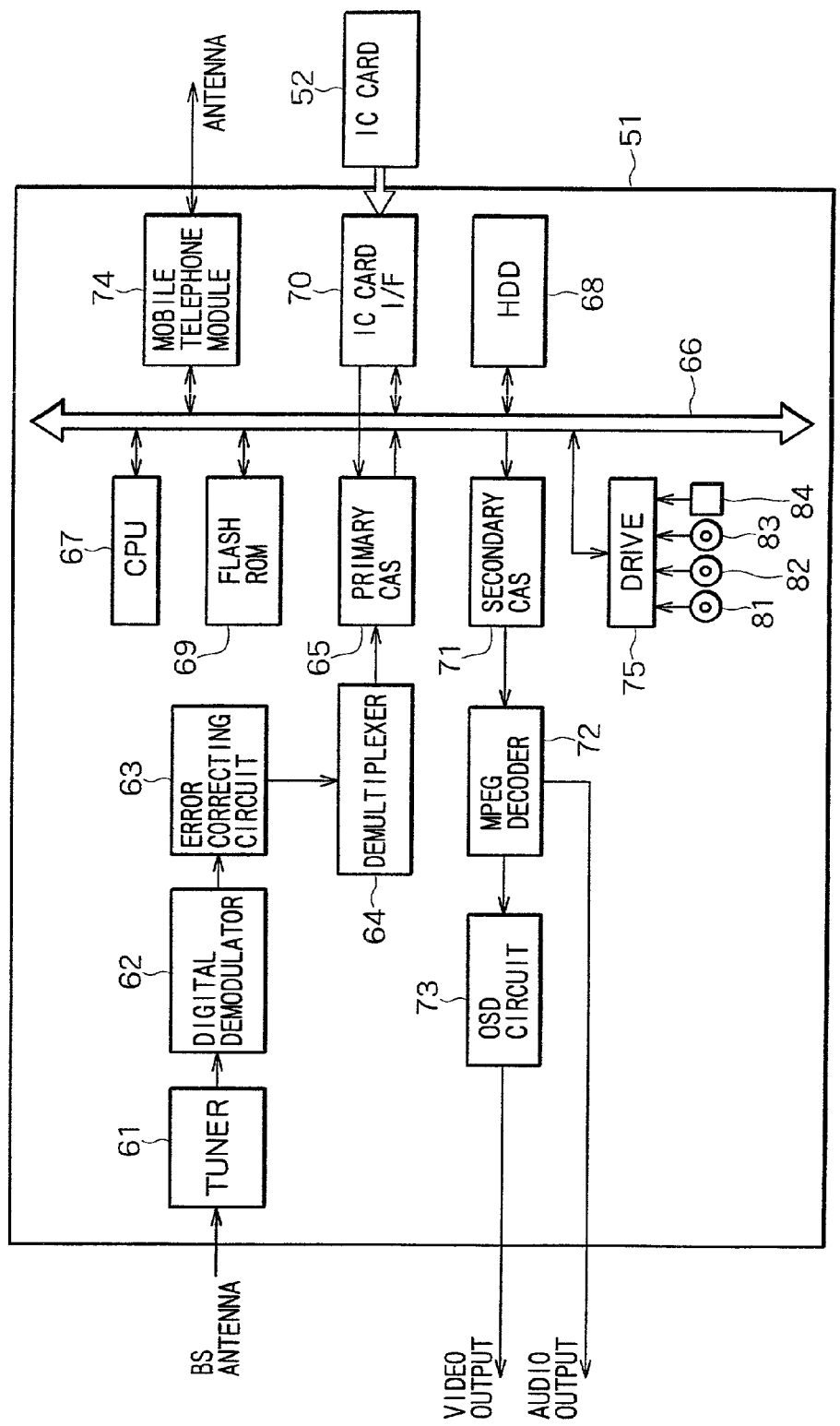
FIG. 6 is a block diagram illustrating an exemplary configuration of a receiver having a storage-type medium.

Referring to FIG. 6, there is shown a block diagram illustrating an exemplary configuration of the receiver 51 which receives programs (namely, content) broadcast by digital television broadcasting and records the received programs to a storage-type medium (in this example, the hard disk drive 68).

A tuner 61 receives an MPEG-TS generated by the MPEG encoder 1 described with reference to FIG. 1 via a BS antenna, not shown, converts the received MPEG-TS into baseband, and outputs the resultant signal to a digital demodulator 62. The digital demodulator 62 digitally demodulates the signal received from the tuner 61 in accordance with a predetermined scheme and outputs the resultant signal to an error correction circuit 63. The error correction circuit 63 performs error correction on the demodulated data received from the digital demodulator 62 and outputs the corrected data to a demultiplexer 64.

The demultiplexer 64 extracts the data of a channel desired by the viewer from the error-corrected stream and outputs the stream to a primary CAS 65. The primary CAS 65 descrambles (namely, decrypts) the first key which is locking the entire stream. The first key for use in decoding in the primary CAS 65 is stored in an IC card 52 beforehand and is input in the primary CAS 65 via an IC card I/F 70 and a system bus 66.

If the recording of the received content to the hard disk drive 68 is instructed by the viewer, the hard disk drive 68 receives the content from the primary CAS 65 via the system bus 66 and records the received content. A CPU 67 registers the data necessary for the storage control of the content to be recorded to the hard disk drive 68 with a content management database in a flash ROM 69 shown in FIG. 7 on the basis of the data written to the ECM and EMM of the content to be recorded.

FAT (File Allocation Table) of the content management database indicates at which location on the hard disk drive 68 the content concerned is recorded. Service ID is a content-unique ID. ECM fixed part attribute data is recorded in the ECM fixed part described with reference to FIG. 5. ECM variable attribute data is recorded in the ECM variable part described with reference to FIG. 5 and includes the storage control information described with reference to FIG. 3. EMM attribute data is recorded in the EMM described with reference to FIG. 5.

Information other than the various information shown in FIG. 7 may be registered with the content management database.

If the realtime outputting of the received content is instructed by the viewer or if the reproduction of content stored in the hard disk drive 68 is instructed by the viewer, a secondary CAS 71 receives the content from the primary CAS 65 or the hard disk drive 68 via the system bus 66 and descrambles (namely, decrypts) a second key locking each content. By use of a descramble key owned by itself or input from a mobile phone module 74, the secondary CAS 71 descramble the second key for each content and outputs the descrambled content to an MPEG decoder 72. At the same time, the secondary CAS 71 reads the charge information for each content and outputs the charge information to the CPU 67.

The mobile phone module 74 communicates with a nearby base station via an antenna, not shown, to connect to a predetermined authentication server, retrieves a key necessary for descrambling each content for use in the descrambling by the secondary CAS 71, and outputs the retrieved key to the secondary CAS 71 via the system bus 66.

The MPEG decoder 72 decodes the data supplied from the secondary CAS 71 and outputs an obtained video signal to an OSD (On Screen Display) circuit 73 and an obtained audio signal to a speaker for example, not shown. the OSD circuit 73, controlled by the CPU 67, multiplexes a video signal such as text with the video signal input from the MPEG decoder 72, and outputs the resultant signal to a monitor, not shown, as a synthesized video signal.

The system bus 66 is also connected to a drive 75 in which a magnetic disc 81, an optical disc 82, a magneto-optical disc 83, or a semiconductor memory 84 is loaded as required for data transfer.

Figure 8:
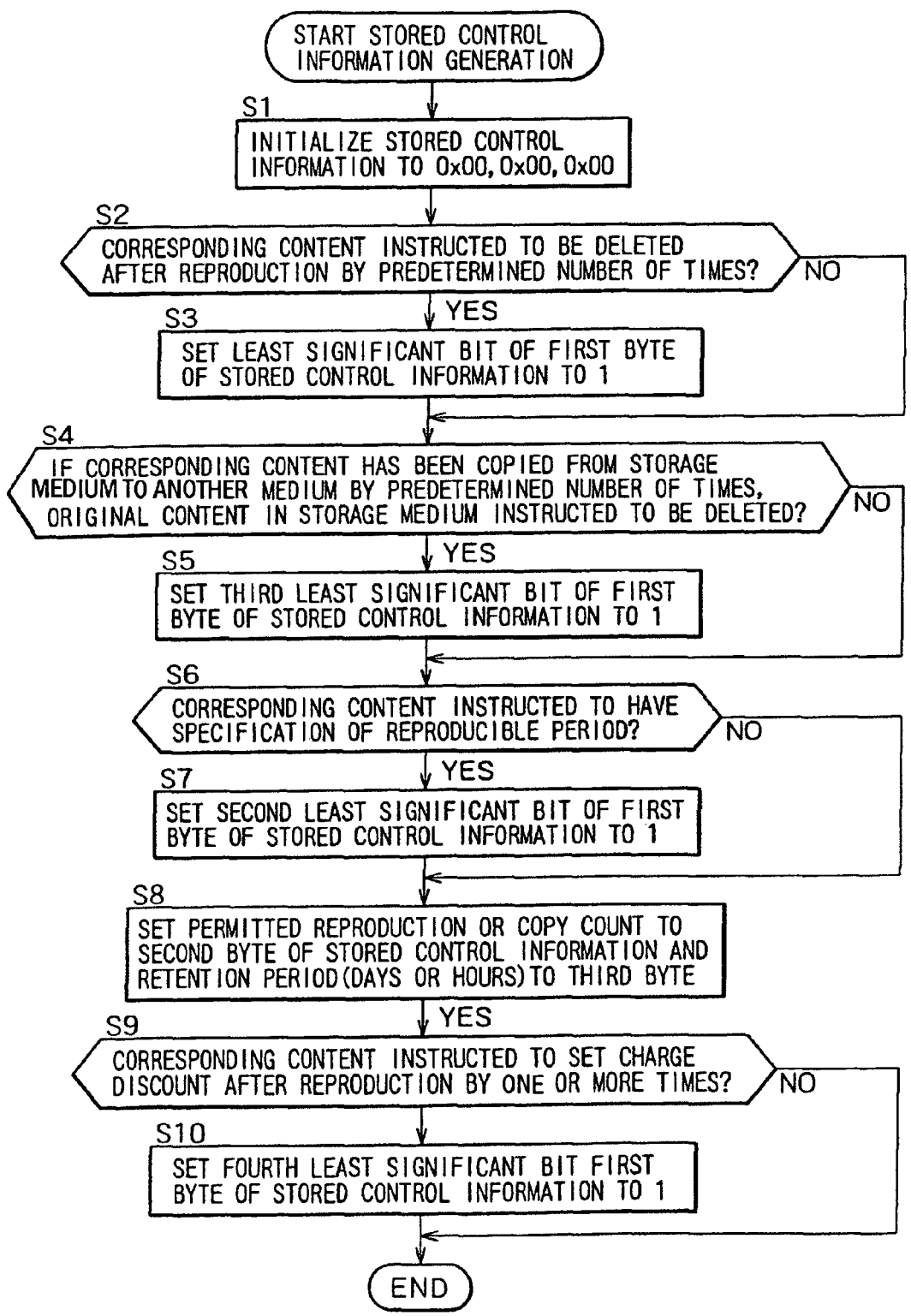
FIG. 8 is a flowchart describing storage control information generating processing.

The following describes, with reference to the flowchart shown in FIG. 8, storage control information generating processing to be executed by the storage control information generator 2 described with reference to FIG. 2.

In step S1, the CPU 31 sets the storage control information to be inserted in predetermined content input via the data interface 33 and the internal bus 32 to initial values 0x00, 0x00, 0x00.

In step S2, if the content concerned has been received by the receiver 51 shown in FIG. 6 and stored in a storage-type medium (for example, the hard disk drive 68 shown in FIG. 6), the CPU 31 determines, on the basis of a signal input from the input block 34 via the internal bus 32, whether this content has been instructed to set the storage control information so that this content will be deleted after the predetermined number of reproduction times.

If this setting is not found instructed in step S2, then the procedure goes to step S4. If this setting is found instructed in step S2, then the CPU 31 sets the least significant bit of the first byte of the storage control information to "1" in step S3.

In this example, if the least significant bit of the first byte is set to "1" as an example of setting the storage control information, the content concerned will be deleted in the receiver 51 after the predetermined number of reproduction times. However, the storage control information setting is not limited to this method. Any other methods may be used (this holds with the following descriptions).

If the setting is not found instructed in step S2 or, after the completion of step S3, if the content concerned has been copied from the storage-type medium to another medium by the predetermined number of times, the CPU 31 determines whether the setting of the storage control information has been instructed so that the original content will be deleted from the storage-type medium on the basis of a signal input from the input block 34 via the internal bus 32.

In step S4, if the content concerned has been copied by the predetermined number of times and the original content in the storage-type medium is not found instructed for deletion, the procedure goes to step S6. If the content concerned has been copied by the predetermined number of times and the original content in the storage-type medium is found instructed for deletion in step S4, then the CPU 31 sets the third least significant bit of the first byte of the storage control information to "1" in step S5.

In step S4, if the content concerned has been copied by the predetermined number of times and the original content in the storage-type medium is not found instructed for deletion or, after the completion of step S5, the CPU 31 determines, in step S6, on the basis of a signal input from the input block 34 via the internal bus 32 whether the setting of the storage control information has been instructed so that the content concerned has the specification of a reproducible period.

In step S6, if the specification is not found instructed, the procedure goes to step S8. If the specification is found instructed, then, the CPU 31 sets the second least significant bit of the first byte of the storage control information to "1" in step S7.

Namely, in case that the content concerned has both the restrictions of the number of reproducible times and the reproducible period of time, then the least significant bit and second least significant bit of the first byte of the storage control information are set to "1."

If the specification is not found instructed in step S6 or, after completion of the process of step S7, the CPU 31 sets in step s8, on the basis of a signal input from the input block 34 via the internal bus 32, sets the number of reproducible or copyable times to the second byte and the storage period of time (the number of days or hours) to the third byte of the storage control information.

In step S9, the CPU 31 determines on the basis of a signal input from the input block 34 via the internal bus 31 whether the setting of the storage control information has been instructed so that the charge for the content concerned will discounted after it is reproduced multiple times.

If the setting of discount charge is not found instructed in step S9, the processing comes to an end. If the setting is found instructed in step S9, then the CPU 31 sets the fourth least significant bit of the first byte of the storage control information to "1" in step S10, upon which the processing comes to an end.

The CPU 31 adds the storage control information generated by the processing described with reference to FIG. 8 to the data which is multiplexed with the MPEG-TS for transmission and outputs the resultant data to the data I/F 13 or the data I/F 16 described with reference to FIG. 1 via the internal bus 32 and the data interface 33. The storage control information is inserted into the ECM variable part of the MPEG-TS generated by the MPEG encoder 1 as described with reference to FIG. 5.

Figure 9:
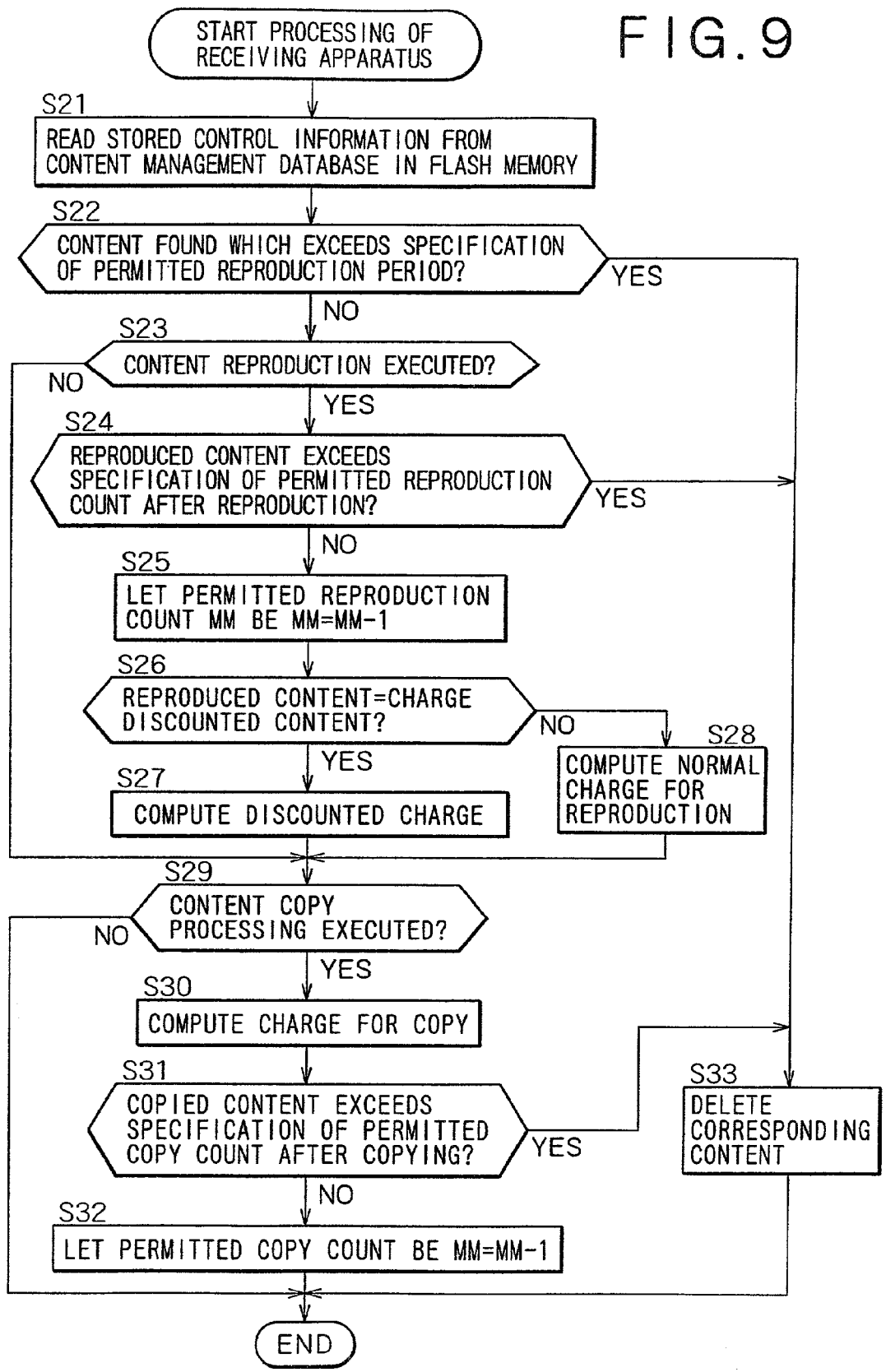
FIG. 9 is a flowchart describing the processing by the receiver.

The following describes the processing to be executed by the receiver 51 with reference to the flowchart shown in FIG. 9.

If file management processing to be executed at a predetermined time interval (for example, once a day) has been executed or if content stored in the hard disk drive 68 has been reproduced or copied to another medium, the CPU 67 reads, in step S21, storage control information from the ECM variable part registered with the content management database in the flash ROM 69 described with reference to FIG. 7 via the system bus 66.

In step S22, the CPU 67 determines on the basis of the storage control information retrieved in step S21 and a time stamp included in the content recorded in the hard disk drive 68 whether there exists any content in excess of the specification of reproducible period of time.

If content exceeding the specification of reproducible period of time is found in step S22, the procedure goes to step S33. If no such content is found, then the CPU 67 determines in step S23 whether a content reproducing process has been executed or not.

If the content reproducing process has not been executed in step S23, the procedure goes to step S29. If the content reproducing process has been executed in step S23, then the CPU 67 determines in step S24 whether the reproduced content exceeds the specification of reproducible count after reproduction MM (namely, whether reproducible count written to the second byte of the storage control information of the content in the content management database becomes 0 or not) on the basis of the storage control information retrieved in step S21.

If the reproduced content is found, in step S24, exceeding the specification of reproducible count after reproduction, the procedure goes to step S33. If the reproduced content is not found exceeding the reproducible count, then, in step S25, the CPU 67 sets reproducible count MM written to the second byte of the storage control information of the content in the content management database to −1.

In step S26, the CPU 67 determines on the basis of the storage control information retrieved in step S21 whether the reproduced content is charge-discount content or not.

If, in step S26, the content is found charge-discount content, then, in step S27, the CPU 67 computes a discounted charge by the predetermined method described with reference to FIG. 4, for example.

If, in step S26, the content is fount not charge-discounted content, then, in step S28, the CPU 67 computes the normal charge for the reproduction.

The data indicative of the result of the charge computation in step S27 or S28 is transmitted to a charge sever for example, not shown, via the system bus 66, the mobile phone module 74, an antenna, not shown, and a public switched phone network, not shown. This data may be transmitted every time the charge computation processing takes place for example or at a predetermined internal such as every day, every week, or every month for example.

If, in step S23, the content producing process is not found executed, then, after the end of step S27 or S28, the CPU 67 determines in step S29 whether the content has been copied or not.

If the content found in step S29 is not copied, the processing comes to an end. If the content is found copied, then, in step S30, the CPU 67 computes the charge for the copying of the content. As with step S27 or S28, the data indicative of the result of the charge computation is also transmitted to a charge server for example, not shown, via the system bus 66, the mobile phone module 74, an antenna, not shown, and a public phone network, not shown.

In step S31, the CPU 67 determines on the basis of the storage control information retrieved in step S21 whether the copied content exceeds the specification of copyable count after the copying (namely, whether the copyable count MM written to the second byte of the storage control information of the content in the content management database becomes 0 or not).

If, in step S31, the copied content is found exceeding the specification of copyable count after the copying, then, in step S32, the CPU 67 sets the copyable count MM written to the second byte of the storage control information of the content in the content management database to −1.

If, in step S22, there exists any content in excess of the specification of reproducible period of time, if, in step S24, the reproduced content is found exceeding the specification of reproducible count after the reproduction, or if, in step S31, the copied content is found exceeding the specification of copyable count after the copying, then the CPU 67 deletes the corresponding content from the hard disk drive 68 in step S33, upon which the processing comes to an end.

In the above-mentioned example, content is recorded in the receiver 51 for receiving digital broadcast and the above-mentioned processing is executed in the same receiver 51. It is also practicable to receive digital broadcast, record content, and execute the processing in respectively separate apparatuses.

Described above is the processing for transferring stream data by attaching storage control information to the ECM variable part of the ECM section described with reference to FIG. 5. In data broadcast transfer in which data blocks are transmitted in a carousel manner, each data block to which storage control information is attached differs from that described with reference to FIG. 5.

The following describes the data transmission based on a carousel method with reference to FIGS. 10 through 13.

Figure 10:
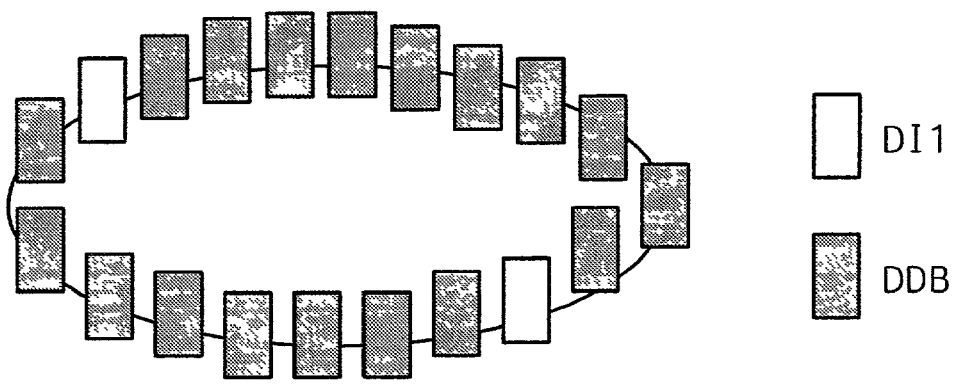
FIG. 10 is a schematic diagram illustrating a carousel scheme in data broadcasting.

In the carousel method, the transmitting side transmits a plurality of data, which are selectively received by the receiving side at necessary times. As shown in FIG. 10, DII (Download Info Indications) packets and DDB (Download Data Block) packets are repeatedly transmitted in a certain period of time like a carousel (or a merry-go-round). A script describing a display method of the transmitted data and the information about the link between data has a byte-code form.

Figure 11:
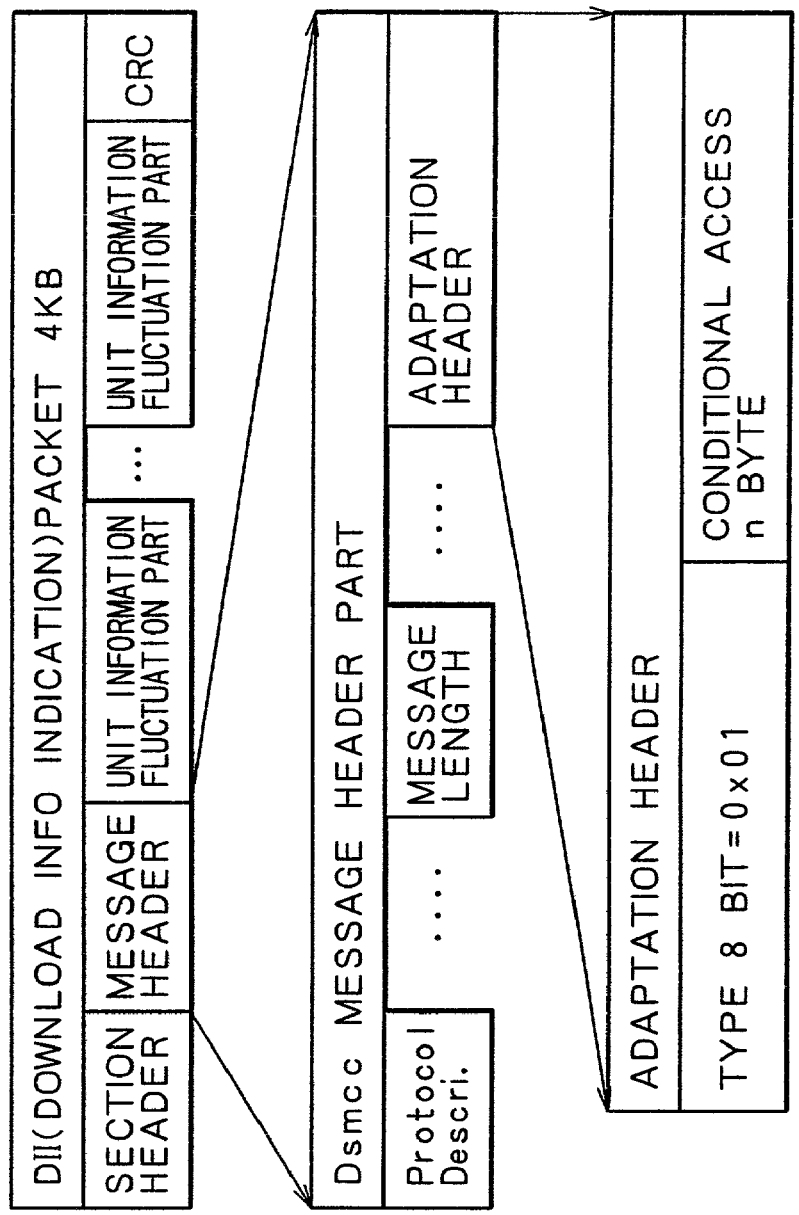
FIG. 11 is a diagram for describing a DII packet to be transmitted by the carousel scheme.

Each DII packet is 4 KB wide as shown in FIG. 11 and constituted by a section header, a message header, a plurality of unit information variable part to which other control data is written, and a CRC for detecting a bit error in transmission.

A Dsmcc (Digital Storage Media-Command and Control) message header part is constituted by predetermined data such as a protocol discriminator, a data length, and adaptation header. The storage control information described with reference to FIG. 3 is inserted in the beginning of the adaptation header by use of the data specified by type number 0x01.

Figure 12:
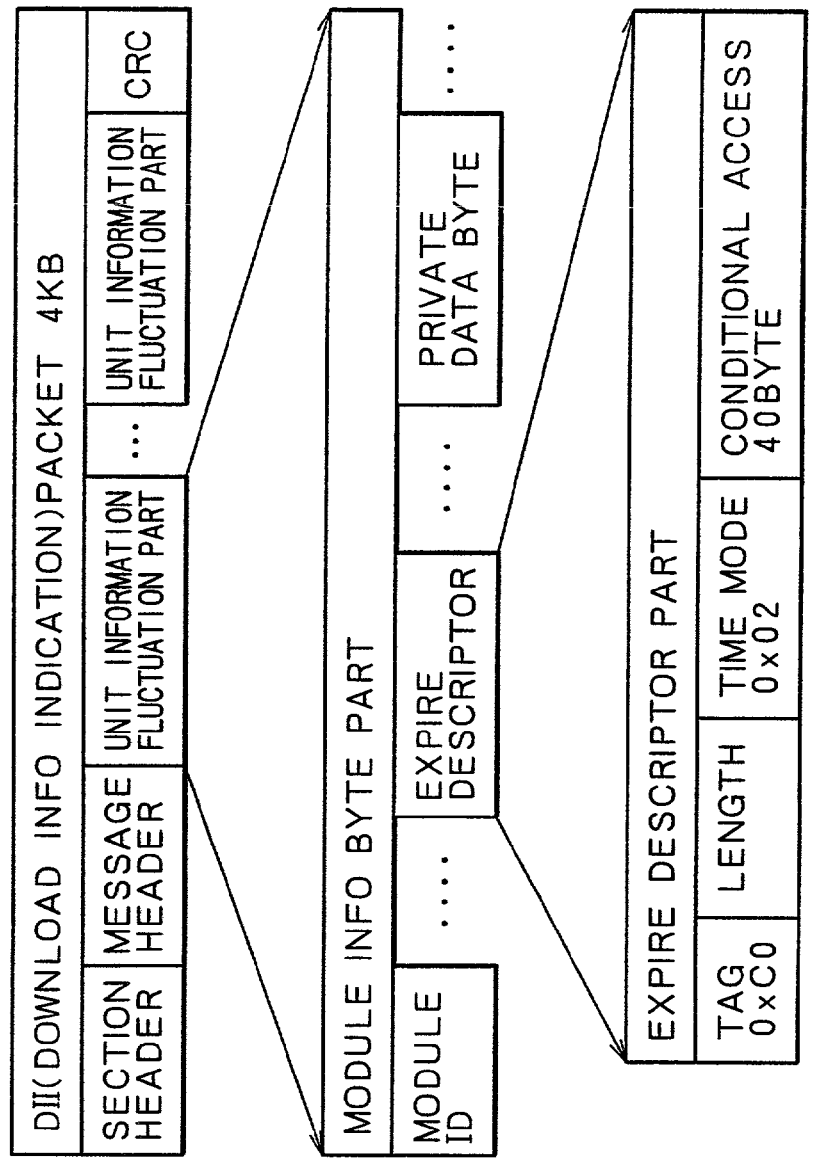
FIG. 12 is a diagram for describing a DII packet to be transmitted by the carousel scheme.

As shown in FIG. 12, a module information area (Module Info Byte) of the unit information variable part is constituted by predetermined data such as a descriptor tag for determining an expire descriptor, a descriptor length indicative of data length, a time mode, and a data part. The storage control information described with reference to FIG. 3 may be inserted in the data part of 40 bytes long specified by time mode 0x02 for example.

Figures 13, 14:
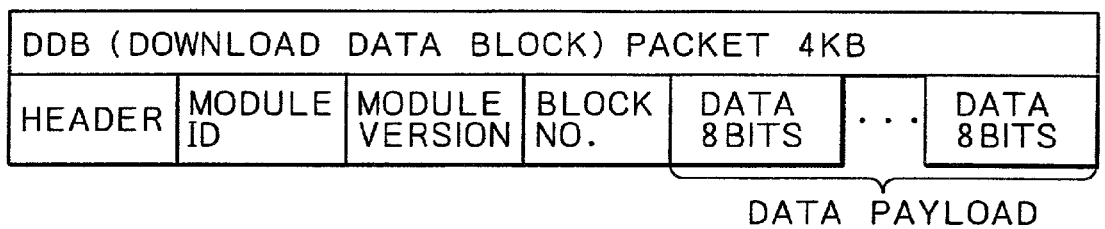
FIG. 13 is a diagram illustrating a DDB packet to be transmitted by the carousel scheme.
FIG. 14 is a diagram for describing the additional identification information area of a data coding descriptor.

Each DDB packet for transmitting the data corresponding to the content part of data broadcast is 4 KB wide as shown in FIG. 13 and constituted by a header, a module ID unique to this packet module, version information of this module, a block number, and a data payload which is a collection of data each being 8 bits wide.

In the receiver 51 described with reference to FIG. 6, if the start data of the header part is 0x11031003, this data is recognized as the data of data broadcast and is processed in the same manner as described above. In data broadcast, the data equivalent to one page or one piece of content of data broadcast is transmitted in a data amount of about 1 MB in the carousel method described with reference to FIG. 10. If the data to be transmitted exceeds 1 MB, a plurality of modules are inserted in one carousel for transmission.

In addition to the above-mentioned data structures, the like storage control information may be inserted in data which is transmitted on the basis of a markup language standard used in BS digital data broadcast called BML (Broadcasting Markup Language). In this case, the storage control information is inserted in "Reserved future use" in the data structure of additional identification information area (additional arib bxml info( )) of a data coding descriptor shown in FIG. 14.

The above-mentioned sequences of processes can be executed by hardware or software. The execution by software is supported by a computer in which the programs constituting the software are installed in a dedicated hardware device beforehand or by a general-purpose personal computer capable of executing various capabilities in which these programs are installed from a network or a recording medium.

The recording medium may be a package medium constituted by the magnetic disk 41 or 81 (including floppy disk), the optical disc 42 or 82 (including CD-ROM (Compact Disc-Read Only Memory) and DVD (Digital Versatile Disc)), the magneto-optical disk 43 or 83 (including MD (Mini Disk)), or the semiconductor memory 44 or 84 shown in FIG. 2 or 6 for providing computer programs separated from computers.

It should be noted that the steps describing the programs to be stored in the program storage medium are not only executed in a time-dependent manner, but also in parallel or in a discrete manner.

As described and according to the first information processing apparatus and method and the program recorded in the recording medium associated with the invention, in the case where the inputting of data to be multiplexed with content to be broadcasted in digital broadcasting is controlled, the content is received by a receiver, and the received content is recorded to a storage-type recording medium, the control information about the deletion of the content is generated and the generated control information is inserted in the data of which inputting is controlled. Consequently, this novel constitution can generate the control information for restricting the storage period of time of the content recorded to a storage-type recording medium and the number of times the content is reproduced or copied.

As described and according to the second information processing apparatus and method and the program recorded in the recording medium associated with the invention, content broadcast in digital broadcasting is captured, the recording of the plural pieces of captured content is controlled, the control information associated with content deletion included in the captured content is captured, the recording of the captured control information is controlled, and, on the basis of the control information, a piece of content to be deleted is selected from among the plural pieces of content, and the selected piece of content is deleted. Consequently, the novel constitution can capture the broadcast data containing the control information and, on the basis of this control information, prevent the content from being recorded.

While the preferred embodiments of the present invention have been described using specific terms, such description is for illustrative purposes only, and it is to be understood that changes and variations may be made without departing from the spirit or scope of the appended claims.

The invention claimed is:

1. An information processing method, comprising:
    obtaining, at a first information processing apparatus, content data to be broadcast by digital broadcast transmission, the content data including at least one of video content data or audio content data;
    generating discount charge data specifying a charge for use of the content data, if the use of the content data at a second information apparatus will be discounted, the use including at least one of reproducing or copying the content data, wherein the charge decreases with a number of times the content data is used;
    inserting the discount charge data into a control message
    multiplexing the content data with the control message by the first information processing apparatus to produce multiplexed data and transmitting the multiplexed data via the digital broadcast transmission;
    receiving and demultiplexing the multiplexed data by the second information processing apparatus to receive the control message and the content data;
    recording the received content data onto a recording medium by the second information processing apparatus;
    using the recorded content data at the second information processing apparatus; and
    charging for the use of the content data at the second information processing apparatus in accordance with the received discount charge data, wherein the charge decreases with the number of times the content data is used.

2. The method as claimed in claim 1, wherein the discount charge data specifies a charging value which is to be divided by a number n when the content data is used an nth time.

3. The method as claimed in claim 1, further comprising encoding the content data, wherein the control message includes an entitlement control message (ECM) and the step of multiplexing the content data includes multiplexing the encoded content data with the ECM via an MPEG2 (Motion Picture Experts Group 2) transport stream.

4. The method as claimed in claim 3, wherein the step of multiplexing the content data includes multiplexing the encoded content data in a carousel manner, and inserting at least a portion of the information of the control message into an adaptation header of a DII (Download Info Indication) packet of the digital broadcast transmission.

5. The method as claimed in claim 3, wherein the step of multiplexing the content data includes multiplexing the content data in a carousel manner and inserting at least a portion of the information of the control message into an expire descriptor of a DII (Download Info Indication) packet of the digital broadcast transmission.

6. An information processing apparatus, comprising:
    a receiver operable to receive a digital broadcast transmission and demultiplex the received transmission into content data and discount charge data specifying a charge for use of the content data, the use including at least one of reproducing or copying the content data; and
    a data recording and reproducing device coupled to the receiver, operable to record the content data onto a recording medium and to reproduce the recorded content data,
    wherein the recording and reproducing device is operable to charge for use of the content data at the second information processing apparatus in accordance with the received discount charge data, the charge decreasing with the number of times the content data is used.

7. The information processing apparatus as claimed in claim 6, wherein the discount charge data specifies a discount charge to be charged for at least one of reproducing or copying the content data an nth time by the information processing apparatus.

8. The method as claimed in claim 2, wherein the discount charge data specifies a charge which varies inversely with the number of times the content data is used.

9. An information processing method, comprising:
receiving a digital broadcast transmission;
demultiplexing the received transmission into content data and discount charge data specifying a charge for use of the content data, the use including at least one of reproducing or copying the content data, wherein the charge decreases with a number of times the content data is used;
recording the content data onto a recording medium; and
charging for use of the recorded content data in accordance with the received discount charge data, the charge decreasing with the number of times the content data is used.

10. The method as claimed in claim 9, wherein the discount charge data specifies a charge which varies inversely with the number of times the content data is used.

11. A computer-readable recording medium having instructions recorded thereon, the instructions being executable by an information processing apparatus to perform a method, the method comprising:
receiving a digital broadcast transmission;
demultiplexing the received transmission into content data and discount charge data specifying a charge for use of the content data, use including at least one of reproducing or copying the content data, wherein the charge decreases with a number of times the content data is used;
recording the content data onto a recording medium; and
charging for use of the recorded content data in accordance with the received discount charge data, the charge decreasing with the number of times the content data is used.

12. The recording medium as claimed in claim 11, wherein the discount charge data specifies a charge which varies inversely with the number of times the content data is used.

* * * * *